(12) United States Patent
Aoki et al.

(10) Patent No.: US 12,162,297 B2
(45) Date of Patent: Dec. 10, 2024

(54) INFORMATION PROCESSING DEVICE, INFORMATION PROCESSING METHOD, AND PROGRAM THEREOF

(71) Applicant: Seiko Epson Corporation, Tokyo (JP)

(72) Inventors: Hiroki Aoki, Nagano (JP); Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 17/512,137

(22) Filed: Oct. 27, 2021

(65) Prior Publication Data

US 2022/0134775 A1  May 5, 2022

(30) Foreign Application Priority Data

Oct. 30, 2020 (JP) ................................ 2020-182404

(51) Int. Cl.
| | |
|---|---|
| *B41J 3/407* | (2006.01) |
| *B41J 2/045* | (2006.01) |
| *B41J 3/54* | (2006.01) |
| *G06N 20/00* | (2019.01) |

(52) U.S. Cl.
CPC ......... *B41J 3/4078* (2013.01); *B41J 2/04541* (2013.01); *B41J 3/543* (2013.01); *G06N 20/00* (2019.01)

(58) Field of Classification Search
CPC ....... B41J 29/393; B41J 3/4078; B41J 11/008
See application file for complete search history.

(56) References Cited

U.S. PATENT DOCUMENTS

| | | | |
|---|---|---|---|
| 6,398,358 B1* | 6/2002 | Miyake | D06P 5/30 |
| | | | 347/102 |
| 6,606,395 B1* | 8/2003 | Rasmussen | B41J 29/393 |
| | | | 358/3.1 |
| 11,639,062 B2* | 5/2023 | Zapata | H04N 1/00045 |
| | | | 358/3.24 |
| 2018/0178550 A1* | 6/2018 | Kremers | B41J 11/008 |

FOREIGN PATENT DOCUMENTS

| | | |
|---|---|---|
| JP | H07-276673 A | 10/1995 |
| JP | 2000-290882 A | 10/2000 |
| JP | 2004-174943 | 6/2004 |
| JP | 2006-234869 A | 9/2006 |
| JP | 2017-132070 A | 8/2017 |
| JP | 2019-117105 | 7/2019 |

* cited by examiner

*Primary Examiner* — Lam S Nguyen
(74) *Attorney, Agent, or Firm* — WORKMAN NYDEGGER

(57) ABSTRACT

An information processing device processes information related to a printing process performed by an inkjet device drawing an image onto a fabric and at least one of a pre-processing device performing pre-processing on the fabric before an image is drawn and a post-processing device performing post-processing on the fabric after an image is drawn, the information processing device including an acquisition unit acquiring image data and original image data, the image data being obtained by digitizing, as an image, the fabric on which the printing process is performed, the original image data being original data of the image drawn on the fabric, a transmission unit transmitting, to a server, the image data and the original image data, and a reception unit receiving, from the server, an image quality parameter obtained by quantifying, by the server, image quality of the image data with respect to the original image data.

10 Claims, 6 Drawing Sheets

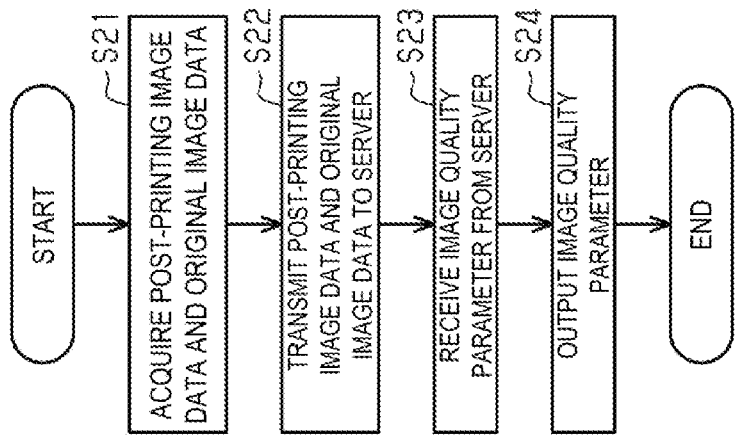
FIG. 4
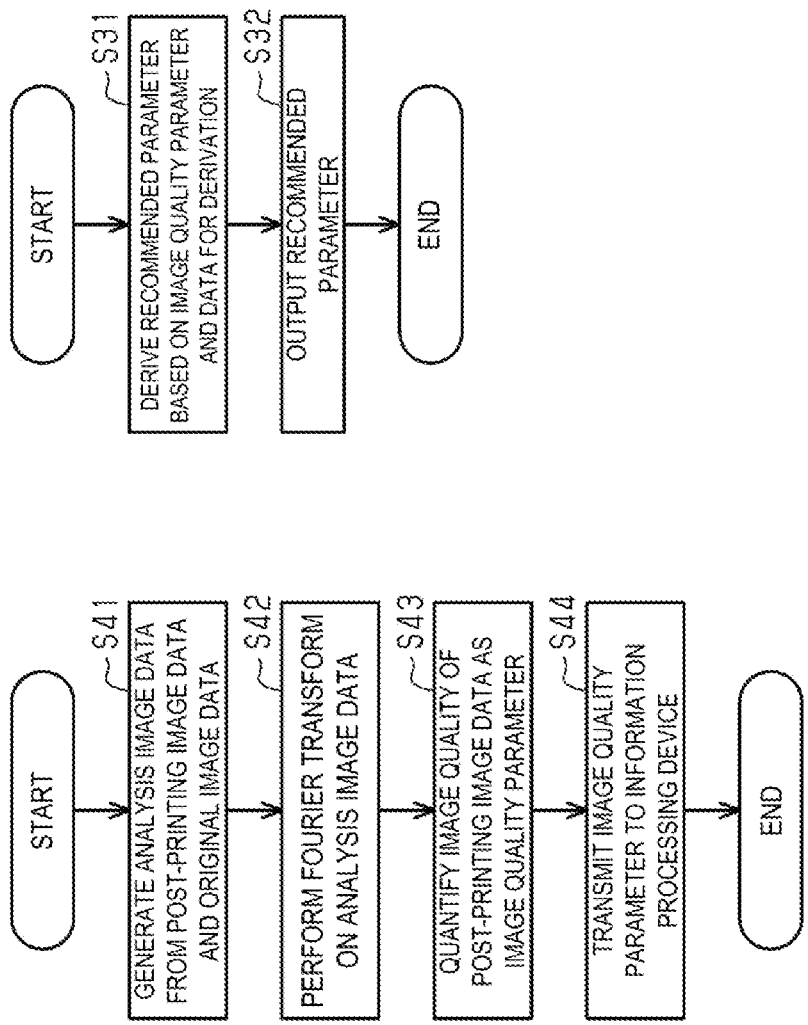
FIG. 5
FIG. 6

INFORMATION PROCESSING DEVICE, INFORMATION PROCESSING METHOD, AND PROGRAM THEREOF

The present application is based on, and claims priority from JP Application Serial Number 2020-182404, filed Oct. 30, 2020, the disclosure of which is hereby incorporated by reference herein in its entirety.

BACKGROUND

1. Technical Field

The present disclosure relates to an information processing device, an information processing method, and a program thereof.

2. Related Art

JP-A-2004-174943 describes a printing printer system for performing a printing process on a fabric. The printing printer system includes, for example, an inkjet device, a pre-processing device, and a post-processing device. A user sets a parameter for each device, e.g., to image quality required by a client of the user.

It is important to objectively evaluate the image quality to set the parameter for each device for the image quality required by the client. There are many types of the image quality such as sharpness and graininess, but it may be difficult for the user to objectively evaluate such image quality. In this case, the user subjectively evaluates the image quality required by the client by visually checking sample data provided by the client.

When the user subjectively evaluates the image quality required by the client, the image quality evaluation may not match between the user and the client. That is, the user may not be able to grasp the image quality required by the client. In this case, the user may repeat the printing process while changing the parameter of each device until the image quality required by the client is obtained, which may complicate the user's work.

SUMMARY

An information processing device for solving the above-described problems includes an information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device including an acquisition unit configured to acquire image data and original image data, the image data being obtained by digitizing, as an image, the fabric on which the printing process is performed, the original image data being original data of the image drawn on the fabric, a transmission unit configured to transmit, to a server, the image data and the original image data, and a reception unit configured to receive, from the server, an image quality parameter obtained by quantifying, by the server, image quality of the image data with respect to the original image data.

An information processing device for solving the above-described problems includes an information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device including an acquisition unit configured to acquire image data and original image data, the image data being obtained by digitizing, as an image, the fabric on which the printing process is performed, the original image data being original data of the image drawn on the fabric, a transmission unit configured to transmit, to a server, the image data and the original image data, and a reception unit configured to receive, from the server, a recommended parameter for at least one device of the inkjet device, the pre-processing device, and the post-processing device, the recommended parameter being derived by the server based on the image data and the original image data.

An information processing method for solving the above-described problems includes an information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method including acquiring image data and original image data, the image data being obtained by digitizing, as an image, the fabric on which the printing process is performed, the original image data being original data of the image drawn on the fabric, transmitting, to a server, the image data and the original image data, and receiving, from the server, an image quality parameter obtained by quantifying, by the server, image quality of the image data with respect to the original image data.

An information processing method for solving the above-described problems includes an information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method including acquiring image data and original image data, the image data being obtained by digitizing, as an image, the fabric on which the printing process is performed, the original image data being original data of the image drawn on the fabric, transmitting, to a server, the image data and the original image data, and receiving, from the server, a recommended parameter for at least one device of the inkjet device, the pre-processing device, and the post-processing device, the recommended parameter being derived by the server based on the image data and the original image data.

A non-transitory computer-readable storage medium for solving the problems described above includes a non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to acquire image data and original image data, the image data being obtained by digitizing, as an image, the fabric on which the printing process is performed, the original image data being original data of the image drawn on the fabric, transmit, to a server, the image data and the original image data, and receive, from the server, an image quality parameter obtained by quantifying, by the server, image quality of the image data with respect to the original image data.

A non-transitory computer-readable storage medium for solving the problems described above includes a non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to acquire image data and original image data, the image data being obtained by digitizing, as an image, the fabric on which the printing process is performed, the original image data being original data of the image drawn on the fabric, transmit, to a server, the image data and the original image data, and receive, from the server, a recommended parameter for at least one device of the inkjet device, the pre-processing device, and the post-processing device, the recommended parameter being derived by the server based on the image data and the original image data.

BRIEF DESCRIPTION OF THE DRAWINGS

FIG. 4 is a flowchart illustrating operation of the information processing device of the first exemplary embodiment.
FIG. 5 is a flowchart illustrating operation different from that of FIG. 4.
FIG. 6 is a flowchart illustrating operation of a server coupled with the information processing device of the first exemplary embodiment.

DESCRIPTION OF EXEMPLARY EMBODIMENTS

First Exemplary Embodiment

Hereinafter, a first exemplary embodiment of an information processing device will be described with reference to the drawings. The information processing device is a device for processing information related to a printing process performed by a printing system. First, the printing system is described.

Figure 1:
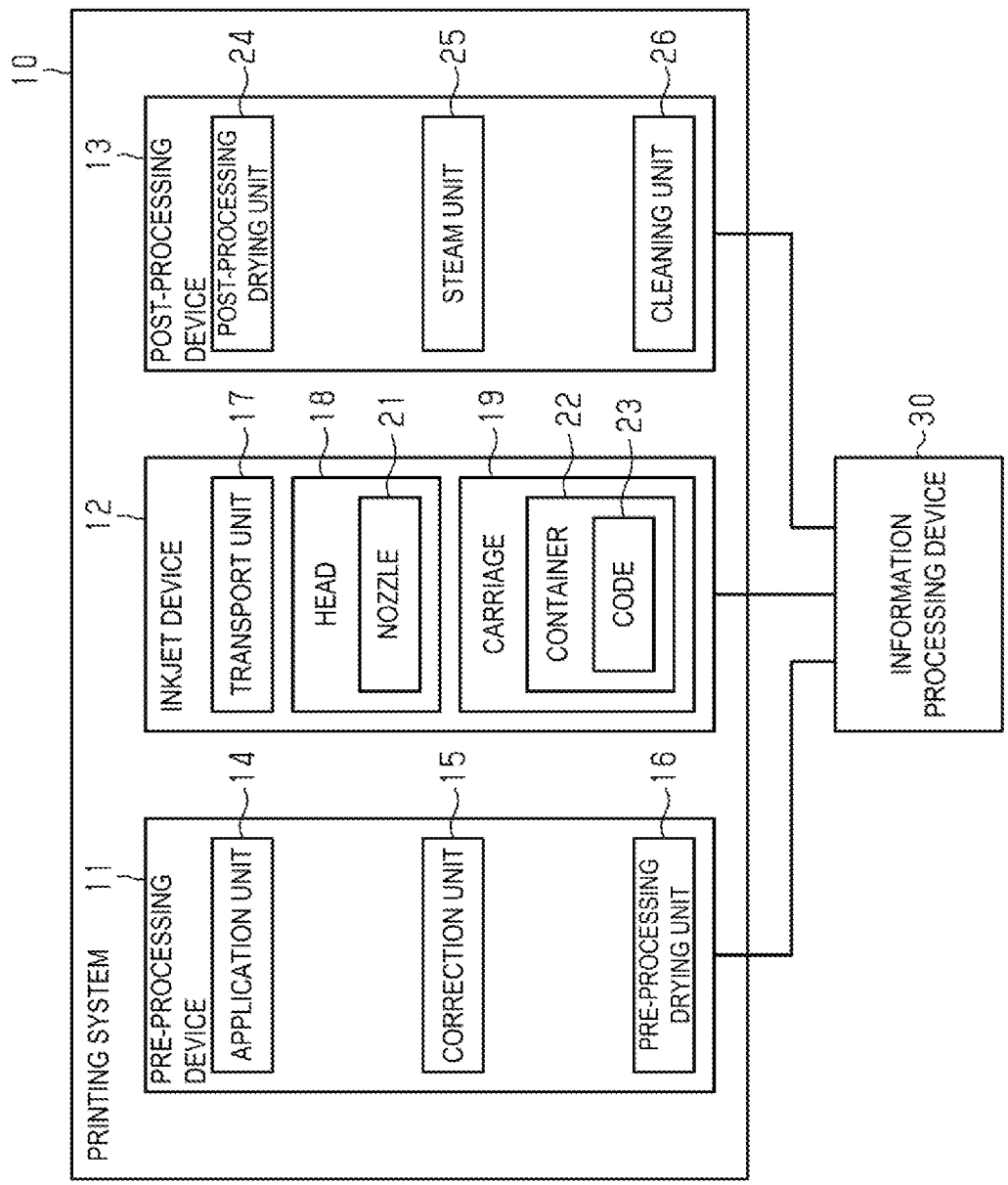
FIG. 1 is a block diagram illustrating a printing system.

As illustrated in FIG. 1, a printing system 10 is constituted by a pre-processing device 11, an inkjet device 12, and a post-processing device 13, for example. The printing system 10 may be constituted by the pre-processing device 11 and the inkjet device 12, or may be constituted by the inkjet device 12 and the post-processing device 13. That is, the printing system 10 includes the inkjet device 12 and at least one of the pre-processing device 11 and the post-processing device 13.

The printing system 10 is a system for performing the printing process on a fabric 99. The printing system 10 performs the printing process on the fabric 99 by three processes, for example, pre-processing, drawing processing, and post-processing. The pre-processing is performed by the pre-processing device 11. The drawing processing is performed by the inkjet device 12. The post-processing is performed by the post-processing device 13.

The printing process is achieved by performing processing on the fabric 99 in an order of the pre-processing, drawing processing, and post-processing, for example. When the printing system 10 is constituted by the pre-processing device 11 and the inkjet device 12, the printing process is achieved by the pre-processing and drawing processing. Where the printing system 10 is constituted by the inkjet device 12 and the post-processing device 13, the printing process is achieved by the drawing processing and post-processing. That is, the printing process is achieved by the drawing processing and at least one of the pre-processing and post-processing.

The printing process may be achieved by a device owned by one user or by cooperation with a device owned by other users. For example, the pre-processing device 11 owned by a first user and the inkjet device 12 and the post-processing device 13 owned by a second user different from the first user may achieve the printing process. In this case, the first user performs the pre-processing on the fabric 99, and the second user performs the drawing processing and post-processing on the fabric 99, whereby the printing process is achieved.

In the printing system 10, coordination may or may not be taken between the devices of the pre-processing device 11, the inkjet device 12, and the post-processing device 13. That is, the pre-processing device 11, the inkjet device 12, and the post-processing device 13 may exchange information to each other or may not exchange information to each other.

The pre-processing device 11 is a device that performs the pre-processing on the fabric 99 before an image is drawn. The pre-processing is a process performed before the drawing processing. The pre-processing device 11 includes, for example, an application unit 14, a correcting unit 15, and a pre-processing drying unit 16.

The application unit 14 is configured to apply pre-processing liquid to the fabric 99. The application unit 14 includes a storage tank that stores the pre-processing liquid, for example. For example, the pre-processing liquid is applied to the fabric 99 by passing the fabric 99 through the storage tank. The pre-processing liquid is liquid for fixing ink to the fabric 99 in the drawing processing. The pre-processing liquid affects hydrophilicity of the fabric 99 with respect to the ink.

The correction unit 15 is configured to correct the fabric 99. The correction unit 15 stretches warp yarns or weft yarns constituting the fabric 99 by applying force to the fabric 99, for example. This allows the fabric 99 to be corrected. The correction unit 15 includes, for example, a roller where the fabric 99 is wound, a pin, a clip, etc. that hold both sides of the fabric 99. The correction unit 15 is a so-called tenter. When the pre-processing liquid is applied to the fabric 99, shrinkage may occur in the fabric 99. As such, the correction unit 15 corrects the fabric 99 by stretching the fabric 99.

The pre-processing drying unit 16 is configured to dry the fabric 99. The pre-processing drying unit 16 is a drying unit included in the pre-processing device 11. The pre-processing drying unit 16 dries the fabric 99 to which the pre-processing liquid has been applied, for example, by heating the fabric 99. The pre-processing drying unit 16 includes a heater, for example.

The inkjet device 12 is a device that performs the drawing processing on the fabric 99. The drawing processing is a process for drawing an image on the fabric 99. The inkjet device 12 discharges the ink onto the fabric 99 to draw the image. The inkjet device 12 draws design images such as pictures, patterns, etc., for example. The inkjet device 12 includes, for example, a transport unit 17, a head 18, and a carriage 19.

The transport unit 17 is configured to transport the fabric 99. The transport unit 17 is, for example, a belt, a roller, etc. The transport unit 17 intermittently transports the fabric 99, for example.

The head 18 is configured to discharge the ink onto the fabric 99. The head 18 has a nozzle 21 for discharging the ink. A nozzle resolution of the head 18 is 600 dpi, for example. As such, the head 18 can draw the image with a resolution of 600 dpi on the fabric 99.

The head 18 is mounted in the carriage 19. The carriage 19 is configured to perform scanning on the fabric 99. The head 18 discharges the ink onto the fabric 99 while the carriage 19 performs scanning, thereby drawing or printing an image on the fabric 99. Thus, the inkjet device 12 is a so-called serial type printer.

The carriage 19 is configured to be mountable with a container 22 accommodating the ink, for example. The container 22 is an ink cartridge, for example. When the container 22 is attached to the carriage 19, the ink is supplied from the container 22 to the head 18. A code 23 for indicating the type of ink to be accommodated is attached to the container 22. The code 23 is, for example, a barcode.

The container 22 is not limited to being mounted in the carriage 19 and may be coupled to the head 18, for example, via a tube. The container 22 may be, for example, a container for refilling an accommodation container separately provided by the inkjet device 12, a so-called ink bottle.

The post-processing device 13 is a device that performs the post-processing on the fabric 99 after the image has been drawn. The post-processing is a process performed after the drawing processing. The post-processing device 13 includes, for example, a post-processing drying unit 24, a steam unit 25, and a cleaning unit 26.

The post-processing drying unit 24 is configured to dry the fabric 99. The post-processing drying unit 24 is a drying unit included in the post-processing device 13. The post-processing drying unit 24 dries the fabric 99 to which the ink has been discharged, for example, by heating the fabric 99. The post-processing drying unit 24 includes, for example, a heater. The post-processing drying unit 24 may be the same drying unit as the pre-processing drying unit 16. In other words, the pre-processing device 11 and the post-processing device 13 may share a drying unit.

The steam unit 25 is configured to supply hot steam to the fabric 99. As the steam unit 25 heats the fabric 99 with steam, the fixing of the ink discharged onto the fabric 99 is promoted.

The cleaning unit 26 is configured to clean the fabric 99. The cleaning unit 26 includes, for example, a cleaning tank that stores cleaning liquid. For example, the fabric 99 is cleaned by passing the fabric 99 through cleaning liquid. The cleaning liquid is, for example, water. When the fabric 99 is cleaned, ink, pre-processing liquid, etc. that are not fixed to the fabric 99 are removed from the fabric 99.

Figure 2:
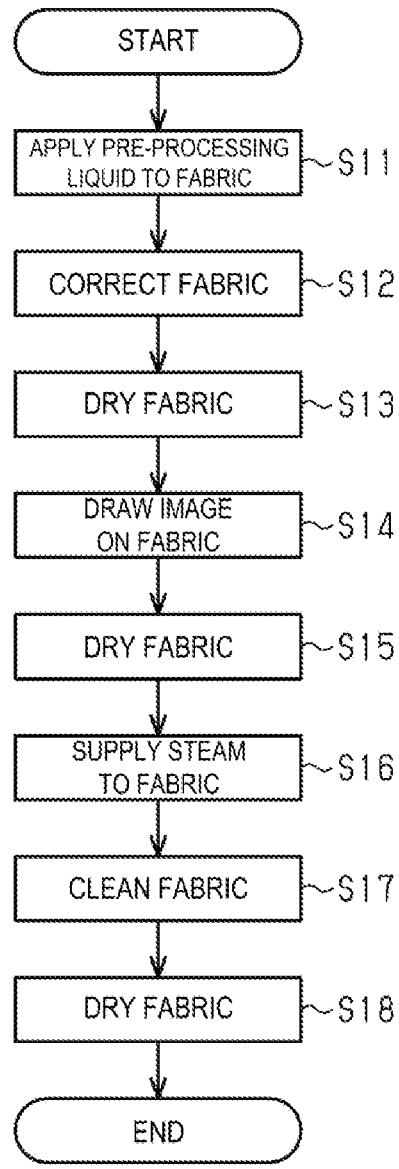
FIG. 2 is a flowchart illustrating a procedure of a printing process.

The printing system 10 performs the printing process, for example, along the flowchart illustrated in FIG. 2. The printing process is initiated by the user, for example.

As illustrated in FIG. 2, the printing system 10 first applies the pre-processing liquid to the fabric 99 by the application unit 14 in step S11.

The printing system 10 corrects the fabric 99 by the correction unit 15 in step S12.

The printing system 10 dries the fabric 99 by the pre-processing drying unit 16 in step S13.

The printing system 10 discharges the ink from the head 18 onto the fabric 99 transported by the transport unit 17 in step S14 to draw an image on the fabric 99. At this time, the carriage 19 is driven along with the head 18.

The printing system 10 dries the fabric 99 by the post-processing drying unit 24 in step S15. At this time, the printing system 10 dries the fabric 99 to an extent that migration of the ink discharged onto the fabric 99 is suppressed. That is, in step S15, the printing system 10 dries the fabric 99 to an extent that a surface of the ink discharged onto the fabric 99 is dried.

The printing system 10 supplies steam to the fabric 99 by the steam unit 25 in step S16.

The printing system 10 cleans the fabric 99 with the cleaning unit 26 in step S17.

The printing system 10 dries the fabric 99 by the post-processing drying unit 24 in step S18. In step S18, unlike step S15, the printing system 10 completely dries the fabric 99. As a result, the fabric 99 wetted by the cleaning liquid is dried. Upon completion of the process of step S18, the printing process is complete.

Next, the information processing device 30 will be described.

As illustrated in FIG. 1, the information processing device 30 is electrically coupled to the printing system 10. For example, the information processing device 30 is electrically coupled to the pre-processing device 11, the inkjet device 12, and the post-processing device 13. As such, the information processing device 30 can exchange information with the pre-processing device 11, the inkjet device 12, and the post-processing device 13.

The information processing device 30 is a device for processing information related to the printing process. The information processing device 30 may also serve as a control device for controlling the printing system 10. In this case, the user controls the printing system 10 via the information processing device 30. The information processing device 30 controls a printing parameter related to the printing process of the printing system 10. The printing parameter includes, for example, a pre-processing parameter related to the pre-processing of the pre-processing device 11, a drawing processing parameter related to the drawing processing of the inkjet device 12, a post-processing parameter for the post-processing of the post-processing device 13, etc.

The pre-processing parameter includes, for example, an amount of the pre-processing liquid applied by the application unit 14, an application time of the pre-processing liquid by the application unit 14, a type of the pre-processing liquid, a direction of force applied by the correction unit 15 to the fabric 99, an amount of the force applied by the correction unit 15 to the fabric 99, a time the correction unit 15 applies the force to the fabric 99, a drying time of the pre-processing drying unit 16, a drying temperature of the pre-processing drying unit 16, etc.

The drawing processing parameter includes, for example, a transport speed of the fabric 99 by the transport unit 17, a distance between the head 18 and the fabric 99, a movement speed of the carriage 19, a number of passes of the carriage 19, a printing mode, a printing direction indicating unidirectional printing or bi-directional printing, etc.

The post-processing parameter includes, for example, a drying time of the post-processing drying unit 24, a drying temperature of the post-processing drying unit 24, a temperature of the steam supplied by the steam unit 25, a supply time of steam by the steam unit 25, a cleaning time by the cleaning unit 26, a temperature of the cleaning water, etc.

The information processing device 30 is, for example, a personal computer. The information processing device 30 may be configured as a circuit including α: one or more processors for performing various processes according to a computer program, β: one or more dedicated hardware circuits such as application-specific integrated circuits that perform at least some processing of various processes, or γ: combinations thereof. The processor includes a CPU and a memory such as a RAM and a ROM, and the memory stores a program code or an instruction configured to cause the CPU to execute a process. The memory, i.e. a computer-readable medium, includes any readable medium that can be accessed by a general-purpose or dedicated computer.

Figure 3:
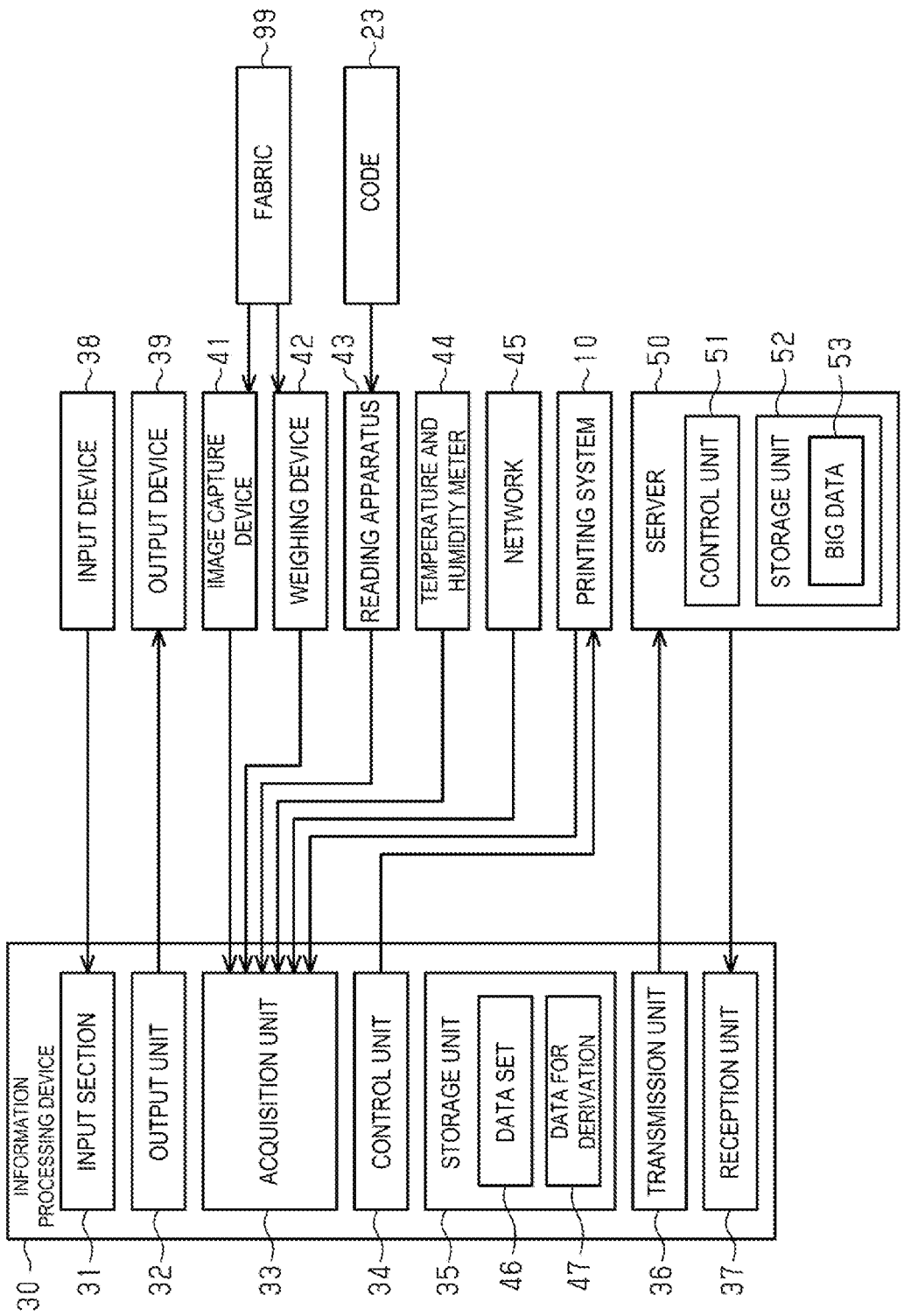
FIG. 3 is a block diagram illustrating an information processing device according to a first exemplary embodiment.

As illustrated in FIG. 3, the information processing device 30 includes, for example, an input unit 31, an output unit 32, an acquisition unit 33, a control unit 34, a storage unit 35, a transmission unit 36, and a reception unit 37.

The input unit 31 is an interface for the user to input data into the information processing device 30. Thus, the input unit 31 is coupled to an input device 38 such as a mouse, keyboard, or touch panel, for example. The user inputs data to the information processing device 30 through the input unit 31 by manipulating the input device 38. The data input through the input unit 31 is stored in the storage unit 35, for example.

The user inputs, for example, client data indicating information about a client through the input unit 31. The information about the client is, for example, a client country, a client name, etc. The user inputs application data indicating, for example, information related to the application of the fabric 99 to which the printing process has been performed through the input unit 31. The information related to the application is information representing an application such as, for example, female clothing, child clothing, interior, etc. The user may input other information to the information processing device 30 as data through the input unit 31, not limited to the client data and the application data.

The output unit 32 is an interface for outputting data from the information processing device 30. The output unit 32 is coupled to an output device 39 such as a display, a speaker, etc. For example, the user can grasp the data output from the information processing device 30 through the output unit 32 by ascertaining the output device 39.

The acquisition unit 33 is an interface for acquiring data from the outside. The acquisition unit 33 is coupled to, for example, an image capturing device 41, a weighing device 42, a reading device 43, a temperature and humidity meter 44, a network 45, the printing system 10, etc. In addition, the acquisition unit 33 may be coupled to a storage medium such as, for example, a USB flash drive, a memory card, etc. The acquisition unit 33 acquires data from the coupled object. The data acquired by the acquisition unit 33 is stored in the storage unit 35, for example.

The acquisition unit 33 acquires data indicating information related to the printing process, for example. When the printing system 10 performs the printing process, the acquisition unit 33 acquires, from the printing system 10, a printing parameter set to the pre-processing device 11, the inkjet device 12, and the post-processing device 13, for example.

The image capturing device 41 is a device that captures the fabric 99 as an image. The image capturing device 41 is, for example, a camera, a scanner, etc. The image capturing device 41 captures the fabric 99 as an image by capturing or scanning the fabric 99. At this time, the image capturing device 41 generates image data obtained by digitizing the fabric 99 as an image. Accordingly, the acquisition unit 33 acquires the image data obtained by digitizing the fabric 99 as an image through the image capturing device 41.

The user appropriately captures the fabric 99 as an image by using the image capturing device 41. For example, by the image capturing device 41, the user captures, as an image, the fabric 99 before the printing process is performed, the fabric 99 after the printing process is performed, the fabric 99 after the pre-processing is performed and before the drawing processing is performed, and the fabric 99 after the drawing processing is performed and before the post-processing is performed, etc. For example, the user captures the fabric 99 as an image at timings before the printing process is performed, after the printing process is performed, after the pre-processing is performed and before the drawing processing is performed, and after the drawing processing is performed and before the post-processing is performed. Thus, the image capturing device 41 generates pre-printing image data obtained by digitizing the fabric 99 before the printing process is performed as an image, post-printing image data obtained by digitizing the fabric 99 after the printing process is performed as an image, pre-drawing image data obtained by digitizing the fabric 99 after the pre-processing is performed and before the drawing processing is performed as an image, and post-drawing image data obtained by digitizing the fabric 99 before the post-processing is performed and after the drawing processing is performed as an image. Accordingly, the acquisition unit 33 can acquire the pre-printing image data, post-printing image data, pre-drawing image data, and post-drawing image data as image data obtained by digitizing the fabric 99 as an image. The acquisition unit 33 of the present example acquires at least the post-printing image data among the image data.

The image capturing device 41 digitizes the fabric 99 as an image at a resolution that is equal to or greater than a resolution of the image drawn by the inkjet device 12, for example. In this case, the image data is data obtained by digization at a resolution that is greater than or equal to the resolution of the image drawn on the fabric 99. In this manner, the image data suitable for image analysis described later can be obtained. The image capturing device 41 may capture the fabric 99 in a full color image, may capture the fabric 99 in a monochrome image, or may capture the fabric 99 in a greyscale image.

The user may capture a surface of the fabric 99 and a back surface of the fabric 99 as an image when capturing the fabric 99 as an image by the image capturing device 41. In this case, the image data includes the data obtained by digitizing the surface of the fabric 99 and the data obtained by digitizing the back surface of the fabric 99.

The user may capture an image in a state where the fabric 99 is stretched and an image in a state where the fabric 99 is not stretched when capturing the fabric 99 as an image by the image capturing device 41. In this case, the image data includes the data obtained by digitizing the fabric 99 in a state where the fabric 99 is stretched and the data obtained by digitizing the fabric 99 in a state where the fabric 99 is not stretched. For example, the user captures the fabric 99 as an image while stretching the fabric 99 by a hand thereof. The user may stretch the fabric 99 in a direction along the warp yarns, may stretch the fabric 99 in a direction along the weft yarns, or may stretch the fabric 99 diagonally relative to the warp yarns and weft yarns.

The weighing device 42 is a device for weighing the fabric 99. The user measures a weight per unit area of the fabric 99 by using the weighing device 42. As a result, the acquisition unit 33 acquires basis weight data indicating the weight per unit area of the fabric 99 through the weighing device 42.

The reading device 43 is a device for reading the code 23 attached to the container 22, for example. The reading device 43 is, for example, a reader. The user causes the reading device 43 to read the code 23 attached to the container 22. The acquisition unit 33 acquires the corresponding ink data with the code 23 read by the reading device 43, for example, by referencing a database stored in the storage unit 35. The ink data is data indicating a type of ink such as, for example, reaction ink, dispersed ink, and acidic ink. The acquisition unit 33 acquires ink data indicating the type of ink accommodated in the container 22 by reading the code 23 attached to the container 22 by the reading device 43.

The temperature and humidity meter 44 is a sensor that measures temperature and humidity. The temperature and humidity meter 44 measures the temperature and humidity of an environment in which the pre-processing device 11, the inkjet device 12, and the post-processing device 13 are installed. As a result, the acquisition unit 33 acquires temperature and humidity data indicating the temperature and humidity of the environment in which the printing system 10 is installed.

The acquisition unit 33 may acquire data the through the network 45 based on the data input from the user. For example, based on data indicating a model number of the fabric 99 input from the user, the acquisition unit 33 may acquire fabric data indicating information about the fabric 99 from the database on the network 45. The fabric data is data indicating the feature value of the fabric 99, such as a thickness, density, and surface roughness of yarns constituting the fabric 99. The fabric data may be data obtained by quantifying the feature value of the fabric 99, or may be data indicating the type of fabric 99 classified based on the feature value of the fabric 99.

For example, based on data indicating a model number of the device input from the user, the acquisition unit 33 may acquire device data indicating information about the device from the database on the network 45. The information about the device includes information related to specifications, settings, etc. of the device. In other words, the acquisition unit 33 may acquire the device data indicating the device information of the pre-processing device 11. The acquisition unit 33 may acquire the device data indicating the device information of the inkjet device 12. The acquisition unit 33 may acquire the device data indicating the device information of the post-processing device 13.

The acquisition unit 33 acquires original image data, which is original data of the image drawn on the fabric 99 by the inkjet device 12, for example, from the storage medium, the network 45, etc. That is, the inkjet device 12 draws an image on the fabric 99 based on the original image data. The original image data can be the original data of the image drawn by the drawing processing. The original image data is, for example, data provided to the user from the client.

Without being limited to the image data, basis weight data, ink data, fabric data, device data, printing parameter, original image data, the acquisition unit 33 may acquire other data. The acquisition unit 33 may acquire the data through the network 45 or may acquire the data through the input unit 31. The example described above is merely an example of the type of data acquired by the acquisition unit 33 and the means for acquiring the data. Accordingly, the acquisition unit 33 may acquire the data other than the type described above, or may acquire the data by a means other than the means described above.

The acquisition unit 33 may acquire status data indicating a usage condition of the pre-processing device 11, the inkjet device 12, and the post-processing device 13. The status data is data indicating the usage condition including environmental information of the pre-processing device 11, the inkjet device 12, and the post-processing device 13.

The status data is data indicating, for example, an operation time, which is the time elapsed since the pre-processing device 11, the inkjet device 12, and the post-processing device 13 have been in operation, the temperature and humidity of the environment in which the printing system 10 is installed, the water quality of the cleaning liquid used in the cleaning unit 26, etc. The status data includes the temperature and humidity data as data indicating the environmental information. The acquisition unit 33 acquires, as status data, for example, operating data indicating the operation time of each device from the printing system 10. The acquisition unit 33 acquires water quality data indicating the water quality of the cleaning liquid by, for example, inputting the water quality of the cleaning fluid through the input unit 31 as data indicating the environmental information.

The acquisition unit 33 may acquire altitude data indicating an altitude at which the pre-processing device 11, the inkjet device 12, and the post-processing device 13 are installed as data indicating the environmental information. The acquisition unit 33 acquires the altitude data by, for example, inputting the altitude at which the pre-processing device 11, the inkjet device 12, and the post-processing device 13 are installed, through the input unit 31. The acquisition unit 33 may acquire the altitude data from the network 45, or may acquire the altitude data by performing conversion from a barometer coupled to the acquisition unit 33.

The control unit 34 is, for example, the CPU described above. The control unit 34 comprehensively controls the information processing device 30. The control unit 34 controls various configurations by executing a program stored in the storage unit 35. The control unit 34 may control the printing system 10, for example. The control unit 34 controls the printing system 10, for example, by transmitting the printing parameter to the printing system 10.

The storage unit 35 is, for example, the memory described above. In addition to the program executed by the control unit 34, the storage unit 35 stores, for example, data input through the input unit 31, data output through the output unit 32, data acquired by the acquisition unit 33, etc. The storage unit 35 stores a data set 46 and derivation data 47, for example.

The storage unit 35 stores one or more data sets 46. The data set 46 is a set of a plurality of data for one printing process. The data set 46 includes data input through the input unit 31, data acquired through the acquisition unit 33, etc. In other words, the storage unit 35 stores data input through the input unit 31, data acquired by the acquisition unit 33, etc. as the data set 46. The storage unit 35 stores the data set 46 illustrated in Table 1, for example.

TABLE 1

|  | Client data | Fabric Data | Original image data | Printing parameter | Post-printing image data | Evaluation data |
|---|---|---|---|---|---|---|
| First data set | Client A | Fabric A | ... | ... | ... | Evaluation A |
| Second data set | Client A | Fabric A | ... | ... | ... | Evaluation B |
| Third data set | Client A | Fabric B | ... | ... | ... | Evaluation C |
| Fourth data set | Client A | Fabric B | ... | ... | ... | Evaluation A |
| ... | ... | ... | ... | ... | ... | ... |

As illustrated in Table 1, the data set 46 is associated with a plurality of data such as, for example, the client data, fabric data, original image data, printing parameter, post-printing image data, evaluation data, etc. Table 1 lists the client data, fabric data, original image data, printing parameter, post-printing image data, and evaluation data, but actually, the data input through the input unit 31 and other data acquired by the acquisition unit 33 are associated, such as the ink data, application data, basis weight data, status data, etc. described above.

The evaluation data is data indicating an evaluation of the client relative to the post-printing image that is prior to the digitization of the post-printing image data associated with the evaluation data. The evaluation data is input through the input unit 31, for example. The client evaluates, for example, in three stages of the image quality of the post-printing image. In the example illustrated in Table 1, evaluation data for first data set and fourth data set indicates an evaluation A, evaluation data for second data set indicates an evaluation B, and evaluation data for third data set indicates an evaluation C.

The evaluation A indicates that the client evaluated that the image quality is sufficient. The evaluation B indicates that the client evaluated that the image quality is slightly insufficient. The evaluation C indicates that the client evaluated that the image quality is insufficient.

The data set 46 is a set of the image data obtained by digitizing the post-printing image obtained by one printing process, the evaluation data for the post-printing image, and various data and various parameters associated with the printing process. The derivation data 47 will be described after the transmission unit 36 and the reception unit 37.

The transmission unit 36 is an interface for transmitting data to the server 50. The transmission unit 36 transmits the post-printing image data and the original image data to the server 50. Transmitter 36 may transmit the data set 46 to the server 50.

The reception unit 37 is an interface for receiving data from the server 50. The reception unit 37 receives an image quality parameter indicating the image quality of the post-printing image data with regard to the original image data. This image quality parameter is a parameter generated by the server 50 based on the post-printing image data and the original image data transmitted to the server 50 by the transmission unit 36. The image quality parameter received by the reception unit 37 may be stored in the storage unit 35.

The image quality parameter is a parameter obtained by quantifying the image quality of the image. That is, the image quality parameter is a parameter obtained by evaluating the image quality of the image by an objective indicator. When the transmission unit 36 transmits the post-printing image data and the original image data to the server 50, the server 50 evaluates the image quality of the post-printing image data based on the original image data using the objective indicator. The reception unit 37 receives the image quality parameter obtained by quantifying, by the server 50, the image quality of the post-printing image data with regard to the original image data.

Examples of the image quality include black concentration, gamut, strikethrough, bleeding, sharpness, color taste, granularity, banding, gradation, etc. The image quality parameter is a parameter that represents such image quality numerically.

By evaluating the image quality of the image as an image quality parameter, the user and client can evaluate the image quality with the same indicator. When the image quality is to be evaluated subjectively, the evaluation of the image quality may be different between the user and the client. In this case, the user may not grasp the image quality required by the client, and there is a risk that the printing process cannot proceed smoothly. Therefore, it is important to quantify the image quality of the image. A method for quantifying image quality of an image is described below.

The user can estimate an evaluation criteria for the client to the image quality from a data group of the image quality parameter received by the reception unit 37 and the evaluation data associated with the image quality parameter. That is, from a large amount of data set 46, the user can estimate the image quality parameter that the client evaluates as sufficient image quality.

The derivation data 47 is data indicating a correspondence relationship between the image quality parameter and the recommended parameter for at least one device of the pre-processing device 11, the inkjet device 12, and the post-processing device 13. The recommended parameter is a printing parameter recommended for obtaining predetermined image quality. That is, the derivation data 47 indicates a correspondence relationship between the image quality parameter and the printing parameter (i.e., the recommended parameter) recommended for obtaining the image quality indicated by the image quality parameter.

The control unit 34 uses the derivation data 47 to derive a recommended parameter from the image quality parameter. The recommended parameter to be derived may be, for example, a printing parameter recommended for obtaining the image quality equivalent to the original image data, or may be a printing parameter recommended for obtaining image quality such that the client evaluates that the image quality is sufficient. The recommended parameter to be derived varies depending on the desired image quality.

The derivation data 47 may be, for example, data defining a learned model learned by machine learning or data defining an analysis model obtained by multivariate analysis.

The derivation data 47, which is data defining the learned model, is generated, for example, by inputting the data set 46 described above into a model for machine learning and by learning the data set 46 into a model. The derivation data 47, which is data defining the analysis model, is generated, for example, by the multivariate analysis of the data set 46 described above. The learned model and the analysis model can be generated, for example, by the server 50 calculating based on the data set 46.

The information processing device 30 performs operation along a flowchart illustrated in FIG. 4, for example. The series of processes illustrated in FIG. 4 is initiated by the user, for example. The series of processes illustrated in FIG. 4 is executed by the control unit 34.

As illustrated in FIG. 4, first, in step S21, the control unit 34 acquires the post-printing image data and the original image data by the acquisition unit 33. Accordingly, step S21 is performed after the printing process by the printing system 10 is performed. The post-printing image data acquired in step S21 is image data obtained by digitizing the post-printing image obtained by the printing process.

In step S21, the control unit 34 may acquire the client data, fabric data, ink data, evaluation data, etc. in addition to the post-printing image data and the original image data. At this time, without being limited to acquiring data from an external device such as the input device 38, the image capturing device 41, etc., for example, the control unit 34 may acquire data from the data set 46 stored in the storage unit 35.

In step S22, the control unit 34 transmits the post-printing image data and the original image data to the server 50 by the transmitting unit 36. At this time, the control unit 34 may transmit another data to the server 50 in addition to the post-printing image data and the original image data. For example, the control unit 34 may transmit the data set 46 to the server 50.

In step S23, the control unit 34 receives the image quality parameter from the server 50 by the reception unit 37. The image quality parameter received in step S23 is a parameter obtained by quantifying the image quality of the post-printing image data with regard to the original image data by the server 50, based on the post-printing image data and the original image data transmitted to the server 50 in step S22.

In step S24, the control unit 34 causes the image quality parameter received to be output through the output unit 32. When the image quality parameter is output through the output unit 32, the user can grasp the image quality parameter indicating the image quality of the post-printing image data with regard to the original image data. This allows the user to grasp the image quality parameter that is insufficient for the original image data with regard to the post-printing image. This allows the user to take advantage of the image quality parameter output as an indicator to obtain the desired image quality.

Upon terminating the process in step S24, the control unit 34 terminates the series of processes illustrated in FIG. 4. As described above, the information processing method for processing information related to the printing process includes acquiring the post-printing image data and the original image data, transmitting, to the server 50, the post-printing image data and the original image data, and receiving, from the server 50, the image quality parameter obtained by quantifying the image quality of the image data with respect to the original image data. The information processing method is implemented, for example, by causing a computer to execute a program. This program may be stored in the storage unit 35, or may be stored in the storage medium. The control unit 34 executes the information processing described above by reading the program.

The control unit 34 may derive, based on the derivation data 47, the recommended parameter corresponding to the specified image quality parameter by specifying the image quality parameter from the user. The control unit 34 may derive the recommended parameter for obtaining the image quality parameter specified by the user based on the derivation data 47.

The user, for example, specifies the desired image quality as an image quality parameter through the input unit 31. That is, the user inputs the image quality parameter to the control unit 34. At this time, the user inputs the image quality parameter in consideration of, for example, an evaluation criteria of the client for the image quality and productivity. Essentially, the image quality and productivity are in a trade-off relationship. Therefore, the better the image quality, the lower the productivity.

When the image quality parameter is input through the input unit 31, the control unit 34 performs operation along the flowchart illustrated in FIG. 5.

As illustrated in FIG. 5, the control unit 34 derives the recommended parameter based on the specified image quality parameter and the derivation data 47 in step S31.

In step S32, the control unit 34 causes the recommended parameter to be output through the output unit 32. When the recommended parameter is output through the output unit 32, the user can grasp the printing parameter recommended for obtaining the image quality indicated by the specified image quality parameter, that is, the desired image quality. This allows the user to take advantage of the recommended parameter output as an indicator to obtain the desired image quality. The control unit 34 may automatically reflect the received recommended parameter to the corresponding device.

Upon terminating the process in step S32, the control unit 34 terminates the series of processes illustrated in FIG. 5. Next, the server 50 will be described.

As illustrated in FIG. 3, the server 50 is electrically coupled to the information processing device 30. Similar to the information processing device 30, the server 50 may be configured as a circuit including α: one or more processors for performing various processes according to a computer program, β: one or more dedicated hardware circuits such as application-specific integrated circuits that perform at least some processing of various processes, or γ: combinations thereof. The processor includes a CPU and a memory such as a RAM and a ROM, and the memory stores a program code or an instruction configured to cause the CPU to execute a process. The memory, i.e. a computer-readable medium, includes any readable medium that can be accessed by a general-purpose or dedicated computer.

The server 50 includes the control unit 51 and the storage unit 52. The control unit 51 is, for example, the CPU described above. The storage unit 52 is, for example, the memory described above.

Upon receiving the data from the information processing device 30, the control unit 51 causes the data to be stored in the storage unit 52. Upon receiving, for example, the post-printing image data and the original image data, the control unit 51 causes the post-printing image data and the original image data to be stored in the storage unit 52. When the control unit 51 receives the data set 46, for example, the control unit 51 causes the data set 46 to be stored in the storage unit 52. In this manner, the control unit 51 accumulates the received data in the storage unit 52. By accumulating data in the storage unit 52, so-called big data 53 is configured.

Upon receiving the post-printing image data and the original image data transmitted from the information processing device 30, the control unit 51 performs image analysis to quantify the image quality of the image. The control unit 51 quantifies the image quality of the post-printing image data with respect to the original image data by analyzing the received post-printing image data and the original image data. The control unit 51 quantifies the image quality by the Fast Fourier Transform, for example. When the image data is in a full color, the control unit 51 performs the Fast Fourier Transform on primary colors, for example.

The post-printing image data is data obtained by digitization at a resolution that is greater than or equal to the resolution of the image drawn on the fabric 99. In other words, deterioration of the image quality is suppressed when capturing the fabric 99 as an image for the post-printing image data. Therefore, the image quality of the post-printing image data can be appropriately quantified.

Upon receiving, for example, a request instruction of the image quality parameter by the information processing device 30, the server 50 performs operation according to the flowchart illustrated in FIG. 6 in order to transmit the image quality parameter to the information processing device 30. At this time, the server 50 receives the post-printing image data and the original image data along with the request instruction for the image quality parameter. The series of processes illustrated in FIG. 6 is a process for analyzing the image data and is executed by the control unit 51.

As illustrated in FIG. 6, in step S41, the control unit 51 first generates analysis image data from the post-printing image data and the original image data. The control unit 51 generates the analysis image data by, for example, taking a luminance difference between the post-printing image data and the original image data for each corresponding pixel. This results in the analysis image data that does not affect an image design. The luminance is expressed, for example, in the Lab color system.

The analysis image data indicates a change in the image quality between the original image data and the post-printing image data. That is, the analysis image data represents the image quality of the post-printing image data based on the original image data. Therefore, by analyzing the analysis image data, it is possible to evaluate how much the image quality of the post-printing image data has changed relative to the original image data. That is, the degree of the deterioration of the image quality can be evaluated.

The control unit 51 performs the Fourier transform on the analysis image data in step S42. At this time, the control unit 51 performs the Fourier transform on two directions in a vertical direction and a horizontal direction with the luminance as an amplitude. As a result, a spectrum such as, for example, a power spectrum, a Wiener spectrum, etc. is obtained for the analysis image data.

In step S43, the control unit 51 quantifies the image quality of the post-printing image data as an image quality parameter by analyzing the spectrum. As described above, examples of the image quality include black concentration, gamut, strikethrough, bleeding, sharpness, color taste, granularity, banding, gradation, etc. An indicator value indicating such image quality is correlated with the spectrum obtained in step S42. For example, when banding occurs, an indicator value indicating the banding is represented in the spectrum. For example, as for granularity, an indicator value indicating the granularity is represented in the spectrum.

The control unit 51 determines the indicator value to be an indicator of the banding based on, for example, the power spectrum of the analysis image data and a predetermined correction function that corrects the visual sensitivity. The control unit 51 determines the indicator value to be an indicator of granularity based on, for example, a predetermined correction function for correcting the luminous sensitivity and the Wiener spectrum of the analysis image data. The correction function is stored in the storage unit 52, for example. The control unit 51 evaluates the banding and granularity, for example, by comparing the obtained indicator value with a reference value thereof. In this manner, the control unit 51 quantifies the image quality of the post-printing image data as an image quality parameter. As a result, the image quality of the post-printing image data with regard to the original image data is evaluated by an objective indicator.

Upon obtaining the image quality parameter of the post-printing image data, the control unit 51 causes the image quality parameter to be stored in the storage unit 52 in association with the post-printing image data and the original image data that are triggered to initiate the series of processes illustrated in FIG. 6. As such, the image quality parameter constitutes the big data 53.

In step S44, the control unit 51 transmits the image quality parameter to the information processing device 30. Upon terminating the process in step S44, the control unit 51 terminates the series of processes illustrated in FIG. 6.

The server 50 generates the image quality parameter by a similar manner to that described above, even when the server 50 receives the post-printing image data and the original image data without the request instruction for the image quality parameter. Specifically, upon receiving the post-printing image data and the original image data, the control unit 51 quantifies the image quality of the post-printing image data as an image quality parameter by a similar procedure to step S41, step S42, and step S43. After that, the control unit 51 associates the obtained image quality parameter with the post-printing image data and the original image data, and causes the obtained image quality parameter to be stored in the storage unit 52.

Next, the generation of the derivation data 47 by the server 50 will be described. The control unit 51 may transmit the generated derivation data 47 to the information processing device 30. In this case, the derivation data 47 stored in the storage unit 35 of the information processing device 30 can be updated.

The control unit 51 may generate the derivation data 47 defining a learned model that derives the recommended parameter from the image quality parameter, for example, from the big data 53 stored in the storage 52.

For example, the control unit 51 inputs the large amount of the image quality parameters and printing parameters stored in the storage unit 52 as supervised data into the model. This causes the model to learn the correlation between the image quality parameter and the printing parameter. Examples of learning techniques include, for example, deep learning. Such learning results in a learned model that outputs the printing parameter recommended for obtaining the image quality indicated by the image quality parameter when the image quality parameter is input.

The control unit 51 changes the data used for learning of the big data 53 in accordance with the purpose of the learned model. In other words, the control unit 51 changes the data used for learning in accordance with input variables input to the learned model and output variables output by the learned model. The data used for learning of the big data 53 is optional. Accordingly, various learned models can be generated from the big data 53. For example, using the image quality parameter and the evaluation data for learning results in a learned model that learns the correlation between the image quality parameter and the evaluation data, i.e., a learning model that grasps the client's criteria for the image quality.

Next, the functions and effects of the information processing device 30 of the first exemplary embodiment will be described.

(1-1) The information processing device 30 includes the acquisition unit 33 configured to acquire the post-printing image data and the original image data, the transmission unit 36 configured to transmit, to the server 50, the post-printing image data and the original image data, and the reception unit 37 configured to receive, from the server 50, the image quality parameter obtained by quantifying, by the server 50, the image quality of the post-printing image data with respect to the original image data.

According to this configuration, the information processing device 30 provides the image quality of the image data with respect to the original image data as a quantified image quality parameter to the user. The image quality parameter allows the user to objectively evaluate the image quality of the image data with regard to the original image data. Thus, the user and the client can evaluate the image quality of the image data with regard to the original image data using the same indicator, depending on the image quality parameter. This allows the user to grasp the image quality required by the client. In this manner, the information processing device 30 can provide an indicator to the user to grasp the image quality required by the client. The user can set the parameter for each device with reference to the image quality parameter. This can make the user's work easier.

(1-2) The post-printing image data is data obtained by digitation at a resolution that is greater than or equal to the resolution of the image drawn on the fabric 99.

According to this configuration, it is possible to obtain the image data suitable for obtaining the image quality parameter indicating the image quality of the post-printing image data with regard to the original image data. In other words, deterioration of the image quality is suppressed when capturing the fabric 99 as an image, so that the server 50 can perform accurate image analysis.

(1-3) The post-printing image data includes the data obtained by digitizing the surface of the fabric 99 and the data obtained by digitizing the back surface of the fabric 99.

For example, the absence of ink strikethrough is important in the image quality. Thus, according to this configuration, it is possible to obtain the image data suitable for obtaining the image quality parameter indicating the image quality of the post-printing image data with regard to the original image data. In other words, the accurate image analysis can be performed by the server 50 in order to confirm the strikethrough of the ink discharged to the fabric 99.

(1-4) The post-printing image data includes the data obtained by digitizing the fabric 99 in a state where the fabric 99 is stretched and the data obtained by digitizing the fabric 99 in a state where the fabric 99 is not stretched.

For example, it is important in the image quality that the strikethrough of the ink does not occur in a state where the fabric 99 is stretched. Thus, according to this configuration, it is possible to obtain the image data suitable for obtaining the image quality parameter indicating the image quality of the post-printing image data with regard to the original image data. In other words, the image analysis with accuracy can be performed by the server 50 in order to confirm the picture in a state where the fabric 99 is stretched.

(1-5) The control unit 34 derives the recommended parameter corresponding to the image quality parameter specified by the user based on the derivation data 47 indicating the correspondence relationship between the image quality parameter and the recommended parameter.

According to this configuration, the user can obtain the image quality indicated by the specified image quality parameter by setting, to the device, the recommended parameter for at least one device of the pre-processing device 11, the inkjet device 12, and the post-processing device 13.

Second Exemplary Embodiment

In a second exemplary embodiment, compared to the first exemplary embodiment, the information processing device 30 differs in that it receives the recommended parameter from the server 50 upon transmitting the post-printing image data and the original image data to the server 50. In other words, in the second exemplary embodiment, the information processing device 30 does not receive the image quality parameter. In the second exemplary embodiment, configurations different from the first exemplary embodiment will be mainly described.

Figure 7:
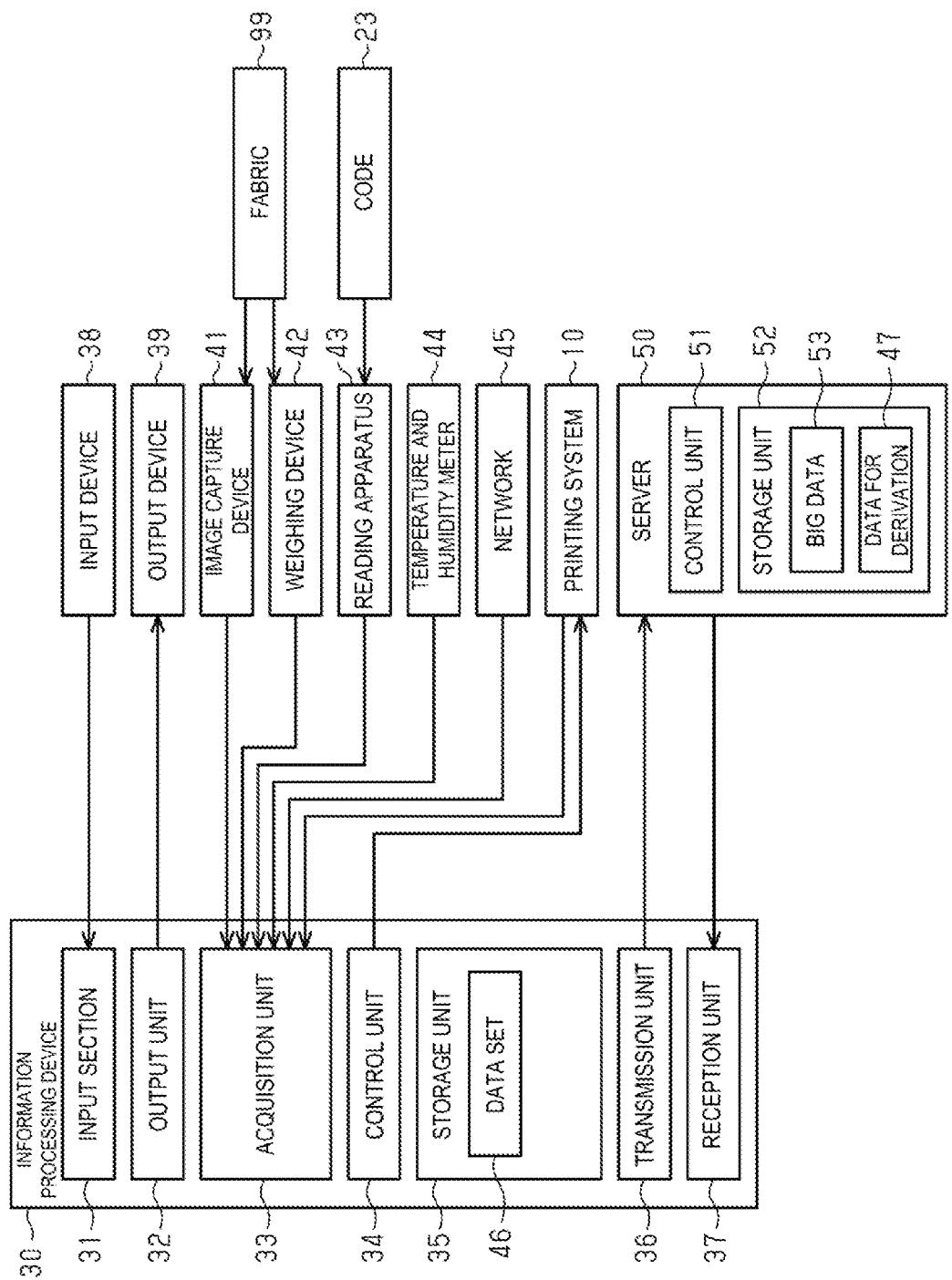
FIG. 7 is a block diagram illustrating an information processing device according to a second exemplary embodiment.

As illustrated in FIG. 7, in the second exemplary embodiment, the storage unit 35 of the information processing device 30 does not store the derivation data 47, while the storage unit 52 of the server 50 stores the derivation data 47.

Figure 8:
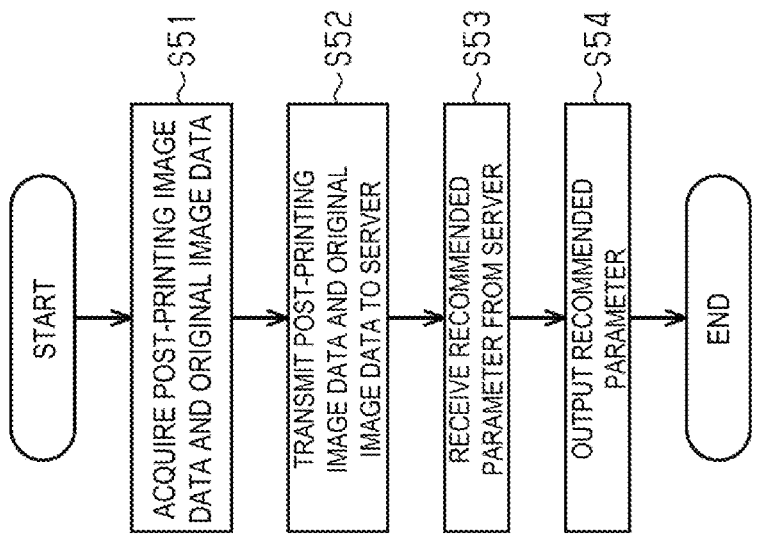
FIG. 8 is a flowchart illustrating operation of the information processing device of the second exemplary embodiment.

The information processing device 30 performs operation along a flowchart illustrated in FIG. 8, for example. The series of processes illustrated in FIG. 8 is initiated by the user, for example. The series of processes illustrated in FIG. 8 is executed by the control unit 34.

As illustrated in FIG. 8, first, in step S51, the information processing device 30 acquires the post-printing image data and the original image data by the acquisition unit 33 in the same manner as in step S21.

In step S52, the control unit 34 transmits the post-printing image data and the original image data to the server 50 by the transmission unit 36, similar to step S22.

In step S53, the control unit 34 receives the recommended parameter from the server 50 by the reception unit 37. The recommended parameter received in step S53 is a parameter derived by the server 50 based on the post-printing image data and the original image data transmitted to the server 50 in step S52.

In step S54, the control unit 34 outputs the recommended parameter through the output unit 32. When the recommended parameter is output through the output unit 32, the user can grasp the desired image quality, that is, the printing parameter recommended for obtaining the image quality required by the client. This allows the user to take advantage of the recommended parameter output as an indicator to obtain the desired image quality.

Upon terminating the process in step S54, the control unit 34 terminates the series of processes illustrated in FIG. 8. The control unit 34 may automatically reflect the received recommended parameter to the corresponding device. As described above, the information processing method for processing information related to the printing process includes acquiring the post-printing image data and the original image data, transmitting, to the server 50, the post-printing image data and the original image data, and receiving, from the server 50, the recommended parameter derived by the server 50 based on the post-printing image data and the original image data. The information processing method is implemented, for example, by causing a computer to execute a program. This program may be stored in the storage unit 35, or may be stored in the storage medium. The control unit 34 executes the information processing described above by reading the program.

Figure 9:
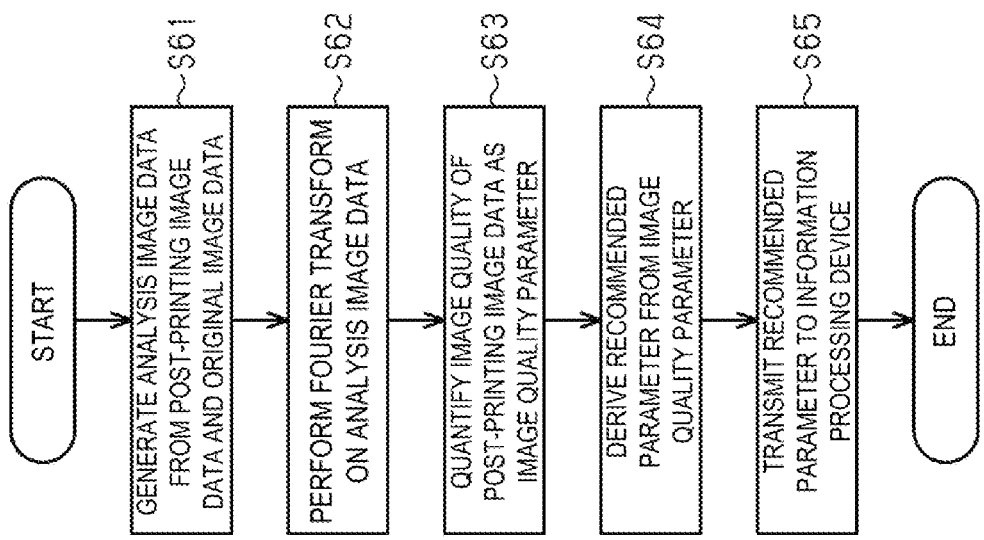
FIG. 9 is a flowchart illustrating operation of a server coupled with the information processing device of the second exemplary embodiment.

Upon receiving the request instruction of the recommended parameter by the information processing device 30, for example, the server 50 performs operation along a flowchart illustrated in FIG. 9 to transmit the recommended parameter to the information processing device 30. At this time, the server 50 receives the post-printing image data and the original image data along with the request instruction. The series of processes illustrated in FIG. 9 is a process for analyzing the image data and is executed by the control unit 51.

As illustrated in FIG. 9, first, in step S61, the control unit 51 generates the analysis image data from the post-printing image data and the original image data in the same manner as in step S41.

In step S62, the control unit 51 performs the Fourier transform on the image data for analysis in the same manner as in step S42.

In step S63, the control unit 51 quantifies the image quality of the post-printing image data as an image quality parameter by analyzing the spectrum in the same manner as in step S43.

Upon obtaining the image quality parameter of the post-printing image data, the control unit 51 causes the image quality parameter to be stored in the storage unit 52 in association with the post-printing image data and the original image data that are triggered to initiate the process illustrated in FIG. 9. As such, the image quality parameter constitutes the big data 53.

The control unit 51 derives the recommended parameter from the image quality parameter using the derivation data 47 in step S64.

In step S65, the control unit 51 transmits the recommended parameter to the information processing device 30.

Upon terminating the process in step S65, the control unit 51 terminates the series of processes illustrated in FIG. 9. The server 50 generates the image quality parameter by a similar manner to that described above, even when the server 50 receives the post-printing image data and the original image data without the request instruction for the recommended parameter. Specifically, upon receiving the post-printing image data and the original image data, the control unit 51 quantifies the image quality of the post-printing image data as an image quality parameter by a similar procedure to step S61, step S62, and step S63. After that, the control unit 51 associates the obtained image quality parameter with the post-printing image data and the original image data, and causes the obtained image quality parameter to be stored in the storage unit 52.

Next, the generation of the derivation data 47 by will be described.

The control unit 51 may generate the derivation data 47 defining a learned model that derives the recommended parameter from the image quality parameter, for example, from the big data 53 stored in the storage 52.

The control unit 51 inputs, for example, the large amount of the image quality parameters, printing parameters, and evaluation data stored in the storage unit 52 as supervised data into the model. This causes the model to learn the correlation between the image quality parameter and the printing parameter and the evaluation data. Examples of learning techniques include, for example, deep learning. Such learning results in a learned model that outputs the printing parameter recommended for obtaining the image quality that the client evaluates as sufficient image quality when the image quality parameter is input.

The image quality parameter is obtained from the post-printing image data and the original image data. Therefore, it can be said that the server 50 derives the recommended parameter based on the post-printing image data and the original image data. When the post-printing image data and the original image data are input, the learned model that outputs the printing parameter recommended for obtaining the image quality that the client evaluates as sufficient image quality may be generated.

The control unit 51 can generate the analysis model for deriving the recommended parameter from, for example, the image quality parameter from the big data 53 stored in the storage unit 52. In order to obtain this analysis model, the control unit 51 performs the multivariate analysis on a large amount of the data set 46 accumulated in the storage unit 52. One example of the multivariate analysis includes an MT method. First, a population, i.e., a unit space in which the evaluation data is evaluation A, is generated from the large amount of the data set 46. Then, the Mahalanobis distance to the unit space is calculated. As a result, the correlation between the evaluation data and other data can be gasped. As the Mahalanobis distance increases, the evaluation data changes in the order of evaluation A, evaluation B, and evaluation C. Next, the threshold value of the Mahalanobis distance with respect to the unit space is determined. According to the analysis model obtained in this manner, the evaluation criteria for the client with respect to the image quality can be grasped. According to the analysis model, it is possible to estimate, from the image quality parameter, the printing parameter recommended for obtaining the same image quality as the original image data, the printing parameter recommended for obtaining the image quality to be evaluated A, etc.

Depending on the type of fabric 99, the application of the fabric 99, etc., it is conceivable that the evaluation criteria for the client with respect to image quality vary. For example, when the application is a female clothing, it is conceivable that the client's criteria for the image quality will be more demanding than when the application is a child's clothing. In this regard, the learned model and analysis model described above can find a correlation between the client's criteria for the image quality and each data. That is, the learned model and analysis model described above can derive the recommended parameter even when the client's criteria for the image quality varies based on other data.

Next, the functions and effects of the second exemplary embodiment will be described.

(2-1) The information processing device 30 includes the acquisition unit 33 configured to acquire the post-printing image data and the original image data, the transmission unit 36 configured to transmit, to the server 50, the post-printing image data and the original image data, and the reception unit 37 configured to receive, from the server 50, the recommended parameter for at least one device of the inkjet device 12, the pre-processing device 11, and the post-processing device 13 generated by the server 50 based on the image data and the original image data.

According to this configuration, the user can obtain the image quality required by the client by setting, to the device, the recommended parameter for at least one device of the inkjet device 12, the pre-processing device 11, and the post-processing device 13. This can make the user's work easier.

The present exemplary embodiment described above may be modified as follows. The present exemplary embodiment described above and the modified examples below may be implemented in combination within a range in which a technical contradiction does not arise.

- In the first exemplary embodiment, the post-printing image data transmitted to the server 50 may be data obtained by digitizing the fabric 99 on which the printing process is performed provided by the client as an image. In this case, the image quality of the post-printing image data is the image quality required by the client. Thus, the user can grasp the image quality required by the client as image quality parameter.
- In the second exemplary embodiment, the post-printing image data transmitted to the server 50 may be data obtained by digitizing the fabric 99 on which the printing process is performed provided by the client as an image. In this case, the image quality of the post-printing image data is the image quality required by the client. Thus, the learned model defined by the derivation data 47 in the second exemplary embodiment may be a learned model similar to the first exemplary embodiment. That is, even a learned model that does not use the evaluation data for learning can derive the recommended parameter for obtaining the image quality required by the client based on the post-printing image data.
- A program causing a computer to process information about the printing process may be distributed and sold, e.g., in a stored state in a storage medium, or distributed and sold over a communication line.
- In addition to the information processing device 30, a control device for controlling the printing system 10 may be provided. In this case, the user controls the printing system 10 through the control device based on the information provided by the information processing device 30.
- The image capturing device 41 may be incorporated into the printing system 10. For example, the image capturing device 41 may be controlled by the information processing device 30.

Hereinafter, technical concepts and effects thereof that are understood from the above-described exemplary embodiments and modified examples will be described.

(A) The information processing device includes an information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device including an acquisition unit configured to acquire image data and original image data, the image data being obtained by digitizing, as an image, the fabric on which the printing process is performed, the original image data being original data of the image drawn on the fabric, a transmission unit configured to transmit, to a server, the image data and the original image data, and a reception unit configured to receive, from the server, an image quality parameter obtained by quantifying, by the server, image quality of the image data with respect to image quality of the original image data.

According to this configuration, the information processing device provides the image quality of the image data with respect to the original image data as quantified image quality parameter to the user. The image quality parameter allows the user to objectively evaluate the image quality of the image data with regard to the original image data. Thus, the user and the client can evaluate the image quality of the image data with regard to the original image data using the same indicator, depending on the image quality parameter. This allows the user to grasp the image quality required by the client. In this manner, the information processing device can provide an indicator to the user to grasp the image quality required by the client. The user can set the parameter for each device with reference to the image quality parameter. This can make the user's work easier.

(B) In the information processing device described above, the image data may be data obtained by digitization at a resolution that is greater than or equal to a resolution of the image drawn on the fabric.

According to this configuration, it is possible to obtain the image data suitable for obtaining the image quality parameter.

(C) In the information processing device described above, the image data may include data obtained by digitizing a surface of the fabric and data obtained by digitizing a back surface of the fabric.

According to this configuration, it is possible to obtain the image data suitable for obtaining the image quality parameter.

(D) In the information processing device described above, the image data may include data obtained by digitizing, as an image, the fabric in a state where the fabric is stretched and data obtained by digitizing, as an image, the fabric in a state where the fabric is not stretched.

According to this configuration, it is possible to obtain the image data suitable for obtaining the image quality parameter.

(E) The information processing device described above includes a storage unit configured to store derivation data configured to indicate a correspondence relationship between the image quality parameter and a recommended parameter for at least one device of the inkjet device, the pre-processing device, and the post-processing device, and a control unit configured to derive, based on the derivation data, the recommended parameter corresponding to the image quality parameter specified by a user.

According to this configuration, the user can obtain the image quality indicated by the specified image quality parameter by setting, to the device, the recommended parameter for at least one device of the inkjet device, the pre-processing device, and the post-processing device.

(F) The information processing device includes an information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device including an acquisition unit configured to acquire image data and original image data, the image data being obtained by digitizing, as an image, the fabric on which the printing process is performed, the original image data being original data of the image drawn on the fabric, a transmission unit configured to transmit, to a server, the image data and the original image data, and a reception unit configured to receive, from the server, a recommended parameter for at least one device of the inkjet device, the pre-processing device, and the post-processing device, the recommended parameter being derived by the server based on the image data and the original image data.

According to this configuration, the user can obtain the image quality required by the client by setting, to the device, the recommended parameter for at least one device of the inkjet device, the pre-processing device, and the post-processing device. This can make the user's work easier.

(G) The information processing method includes an information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method including acquiring image data and original image data, the image data being obtained by digitizing, as an image, the fabric on which the printing process is performed, the original image data being original data of the image drawn on the fabric, transmitting, to a server, the image data and the original image data, and receiving, from the server, an image quality parameter obtained by quantifying, by the server, image quality of the image data with respect to the original image data.

According to this method, the same effect as that of the information processing device described above can be obtained.

(H) The information processing method includes an information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method including acquiring image data and original image data, the image data being obtained by digitizing, as an image, the fabric on which the printing process is performed, the original image data being original data of the image drawn on the fabric, transmitting, to a server, the image data and the original image data, and receiving, from the server, a recommended parameter for at least one device of the inkjet device, the pre-processing device, and the post-processing device, the recommended parameter being derived by the server based on the image data and the original image data.

According to this method, the same effect as that of the information processing device described above can be obtained.

(I) The non-transitory computer-readable storage medium includes a non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to acquire image data and original image data, the image data being obtained by digitizing, as an image, the fabric on which the printing process is performed, the original image data being original data of the image drawn on the fabric, transmit, to a server, the image data and the original image data, and receive, from the server, an image quality parameter obtained by quantifying, by the server, image quality of the image data with respect to the original image data.

According to this program, the same effect as that of the information processing device described above can be obtained.

(J) The non-transitory computer-readable storage medium includes a non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to acquire image data and original image data, the image data being obtained by digitizing, as an image, the fabric on which the printing process is performed, the original image data being original data of the image drawn on the fabric, transmit, to a server, the image data and the original image data, and receive, from the server, a recommended parameter for at least one device of the inkjet device, the pre-processing device, and the post-processing device, the recommended parameter being derived by the server based on the image data and the original image data.

According to this program, the same effect as that of the information processing device described above can be obtained.

What is claimed is:

1. An information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device comprising:
 an acquisition unit configured to acquire post-printing image data and original image data, the post-printing image data being obtained by digitizing, as an image, the fabric on which the printing process has been performed, the original image data being original data of the image drawn on the fabric;

a transmission unit configured to transmit, to a server, the post-printing image data and the original image data;

a reception unit configured to receive, from the server, an image quality parameter based on a difference between the post-printing image data and the original image data;

a storage unit configured to store derivation data configured to indicate a correspondence relationship between the image quality parameter and a recommended parameter for at least one device of the inkjet device, the pre-processing device, and the post-processing device; and a control unit configured to derive, based on the derivation data, the recommended parameter corresponding to the image quality parameter specified by a user.

2. The information processing device according to claim 1, wherein
the post-printing image data is data obtained by digitization at a resolution that is greater than or equal to a resolution of the image drawn on the fabric.

3. The information processing device according to claim 1, wherein
the post-printing image data includes data obtained by digitizing a surface of the fabric and data obtained by digitizing a back surface of the fabric.

4. The information processing device according to claim 1, wherein
the post-printing image data includes data obtained by digitizing, as an image, the fabric in a state where the fabric is stretched and data obtained by digitizing, as an image, the fabric in a state where the fabric is not stretched.

5. The information processing device according to claim 1, wherein the difference is a luminance difference between the post-printing image data and the original image data.

6. An information processing device configured to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the information processing device comprising:

an acquisition unit configured to acquire post-printing image data and original image data, the post-printing image data being obtained by digitizing, as an image, the fabric on which the printing process has been performed, the original image data being original data of the image drawn on the fabric;

a transmission unit configured to transmit, to a server, the post-printing image data and the original image data;

a reception unit configured to receive, from the server, a recommended parameter for at least one device of the inkjet device, the pre-processing device, and the post-processing device, the recommended parameter being derived by the server based on a difference between the post-printing image data and the original image data;

a storage unit configured to store derivation data configured to indicate a correspondence relationship between the image quality parameter and a recommended parameter for at least one device of the inkjet device, the pre-processing device, and the post-processing device; and a control unit configured to derive, based on the derivation data, the recommended parameter corresponding to the image quality parameter specified by a user.

7. An information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method comprising:

acquiring post-printing image data and original image data, the post-printing image data being obtained by digitizing, as an image, the fabric on which the printing process is performed, the original image data being original data of the image drawn on the fabric;

transmitting, to a server, the post-printing image data and the original image data; and receiving, from the server, an image quality parameter based on a difference between the post-printing image data and the original image data;

storing derivation data configured to indicate a correspondence relationship between the image quality parameter and a recommended parameter for at least one device of the inkjet device, the pre-processing device, and the post-processing device; and deriving, based on the derivation data, the recommended parameter corresponding to the image quality parameter specified by a user.

8. An information processing method for processing information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, the method comprising:

acquiring post-printing image data and original image data, the post-printing image data being obtained by digitizing, as an image, the fabric on which the printing process is performed, the original image data being original data of the image drawn on the fabric;

transmitting, to a server, the post-printing image data and the original image data; and receiving, from the server, a recommended parameter for at least one device of the inkjet device, the pre-processing device, and the post-processing device, the recommended parameter being derived by the server based on a difference between the post-printing image data and the original image data;

storing derivation data configured to indicate a correspondence relationship between the image quality parameter and a recommended parameter for at least one device of the inkjet device, the pre-processing device, and the post-processing device; and deriving, based on the derivation data, the recommended parameter corresponding to the image quality parameter specified by a user.

9. A non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to:

acquire post-printing image data and original image data, the post-printing image data being obtained by digitizing, as an image, the fabric on which the printing process has been performed, the original image data being original data of the image drawn on the fabric;

transmit, to a server, the post-printing image data and the original image data; asks receive, from the server, an image quality parameter based on a difference between the post-printing image data and the original image data;

storing derivation data configured to indicate a correspondence relationship between the image quality parameter and a recommended parameter for at least one device of the inkjet device, the pre-processing device, and the post-processing device; and deriving, based on the derivation data, the recommended parameter corresponding to the image quality parameter specified by a user.

10. A non-transitory computer-readable storage medium storing a program for causing a computer to process information related to a printing process performed by an inkjet device and at least one of a pre-processing device and a post-processing device, the inkjet device being configured to draw an image by discharging ink onto a fabric, the pre-processing device being configured to perform pre-processing on the fabric before an image is drawn, the post-processing device being configured to perform post-processing on the fabric after an image is drawn, wherein the program causes the computer to:

acquire post-printing image data and original image data, the post-printing image data being obtained by digitizing, as an image, the fabric on which the printing process is performed, the original image data being original data of the image drawn on the fabric;

transmit, to a server, the post-printing image data and the original image data; and receive, from the server, a recommended parameter for at least one device of the inkjet device, the pre-processing device, and the post-processing device, the recommended parameter being derived by the server based on a difference between the post-printing image data and the original image data;

storing derivation data configured to indicate a correspondence relationship between the image quality parameter and a recommended parameter for at least one device of the inkjet device, the pre-processing device, and the post-processing device; and deriving, based on the derivation data, the recommended parameter corresponding to the image quality parameter specified by a user.

* * * * *